United States Patent [19]

Ishikawa et al.

[11] Patent Number: 5,417,623
[45] Date of Patent: May 23, 1995

[54] METHOD OF CONTROLLING CONTINUOUSLY VARIABLE TRANSMISSION FOR MOTOR VEHICLE FOR ACCELERATION AND DECELERATION SKIP CONTROL

[75] Inventors: Yoshikazu Ishikawa, Hiki; Hideo Koyama, Shinjyuku; Takamichi Shimada, Sakado, all of Japan

[73] Assignee: Honda Giken Kogyo Kabushiki Kaisha, Tokyo, Japan

[21] Appl. No.: 6,058

[22] Filed: Jan. 19, 1993

[30] Foreign Application Priority Data

Jan. 21, 1992 [JP] Japan ................................. 4-030019

[51] Int. Cl.$^6$ ............................................. F16H 39/44
[52] U.S. Cl. ........................................ 477/68; 477/905
[58] Field of Search ..................... 364/424.1; 74/866; 477/46, 48, 52, 68, 904, 905

[56] References Cited

U.S. PATENT DOCUMENTS

| | | | |
|---|---|---|---|
| 4,872,115 | 10/1989 | Itoh et al. | 364/424.1 |
| 4,962,679 | 10/1990 | Ishikawa et al. | 477/68 X |
| 4,967,610 | 11/1990 | Sasajima et al. | 74/866 |
| 5,161,433 | 11/1992 | Sakakibara et al. | 74/866 |
| 5,166,877 | 11/1992 | Ishikawa et al. | 74/866 |
| 5,282,400 | 2/1994 | Kobayashi et al. | 74/866 |

FOREIGN PATENT DOCUMENTS

| | | |
|---|---|---|
| 258004 | 3/1988 | European Pat. Off. . |
| 310447 | 5/1989 | European Pat. Off. . |
| 352110 | 1/1990 | European Pat. Off. . |
| 424088 | 4/1991 | European Pat. Off. . |
| 63-53343 | 3/1988 | Japan . |
| 63-53344 | 3/1988 | Japan . |
| 63-53345 | 3/1988 | Japan . |
| 63-53346 | 3/1988 | Japan . |
| 193662 | 4/1989 | Japan . |
| 1120475 | 5/1989 | Japan . |
| 2249727 | 10/1990 | Japan . |

OTHER PUBLICATIONS

English translation of Abstract of JP 2-249727.
English translation of Abstract of JP 63-53343; 63-53344; 63-53345; and 63-53346.

Primary Examiner—Dirk Wright
Assistant Examiner—Khoi Q. Ta
Attorney, Agent, or Firm—Lyon & Lyon

[57] ABSTRACT

A continuously variable transmission on a motor vehicle is controlled to control a speed reduction ratio using, as a control value, a rate of change di/dt of the speed reduction ratio that is determined using a reserve horsepower of an engine on the motor vehicle, an engine rotational speed Ne, a vehicle speed V of the motor vehicle, a present acceleration Ga of the motor vehicle, and a target acceleration Gon. A control process detects whether a rate of change of an indication by a driver of the motor vehicle of an intention to accelerate or decelerate the motor vehicle is greater than a predetermined value or not, whether a target engine rotational speed Neo corresponding to the indication is greater than an actual engine rotational speed Nea or not and whether the target acceleration Gon is greater than the present acceleration Ga on an acceleration side (positive side) or not. If the rate of change of the indication is greater than the predetermined value, the target engine rotational speed Neo is greater than the actual engine rotational speed Nea, and the target acceleration Gon is greater than the present acceleration Ga on the acceleration side (positive side), then an acceleration skip control process is determined as being required, and carried out to increase the rate of change di/dt of the speed reduction ratio immediately thereafter.

18 Claims, 13 Drawing Sheets

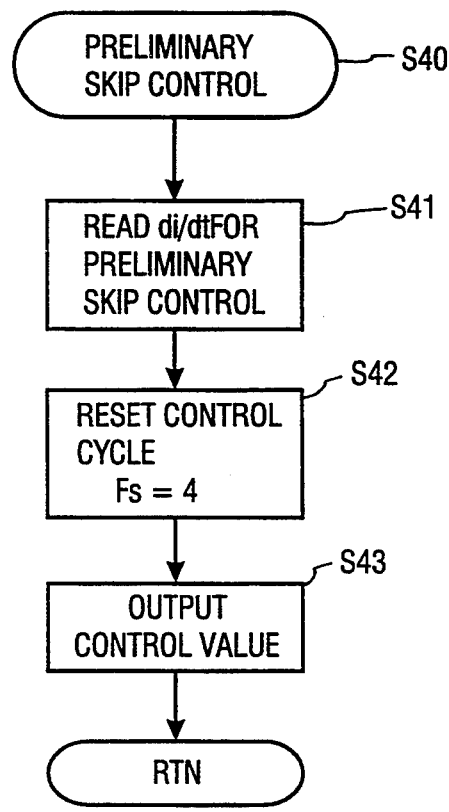
*FIG. 11*
*FIG. 17*
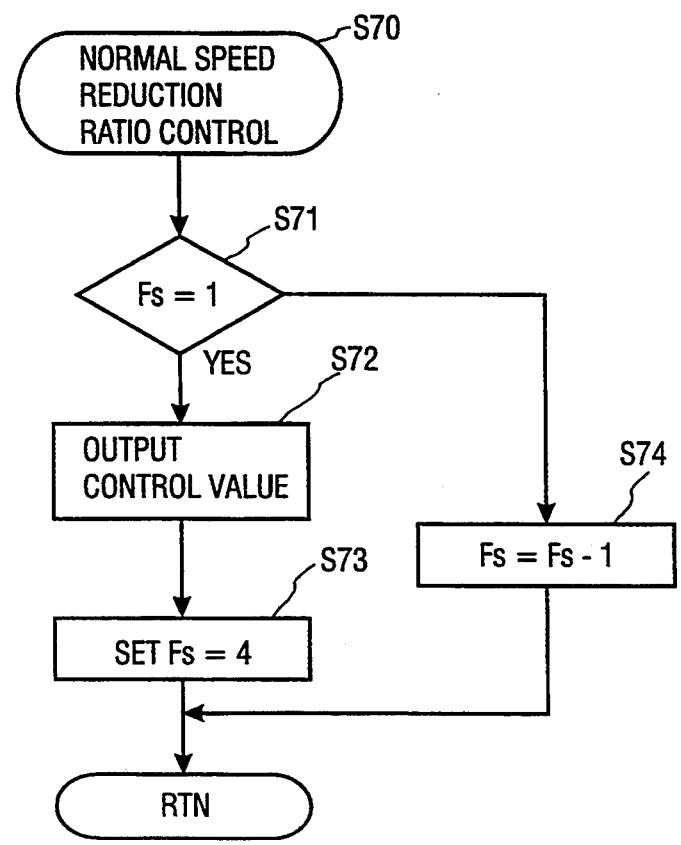

METHOD OF CONTROLLING CONTINUOUSLY VARIABLE TRANSMISSION FOR MOTOR VEHICLE FOR ACCELERATION AND DECELERATION SKIP CONTROL

BACKGROUND OF THE INVENTION

1. Field of the Invention

The present invention relates to a method of controlling the speed reduction ratio of a continuously variable transmission for use on a motor vehicle, and more particularly to a method of controlling the speed reduction ratio of such a continuously variable transmission in response to the driver's operation for acceleration or deceleration, e.g., the depression of an accelerator pedal, the shifting of a manual shift lever, or the like.

2. Description of the Prior Art

According to one conventional method of controlling the speed reduction ratio of a continuously variable transmission on a motor vehicle, a target engine rotational speed Neo is set depending on, for example, the accelerator opening which may be the depth to which the accelerator pedal is depressed, or the opening of an engine throttle valve, and then an actual engine rotational speed Nea is controlled into conformity with the target engine rotational speed Neo that has been set. However, the conventional control method tends to suffer a problem in the control of the speed reduction ratio when the engine rotational speed is in a transient state.

Such a problem will be described by way of example in detail below. It is assumed, as shown in FIG. 20 of the accompanying drawings, that while the motor vehicle is cruising at a vehicle speed V1 with an engine rotational speed N1 as indicated by a point A in FIG. 20 (at this time, a target engine rotational speed corresponding to the accelerator opening is the same as the actual engine rotational speed N1), the accelerator pedal is depressed to increase the target engine rotational speed up to N2.

To increase the target engine rotational speed, the continuously variable transmission may be controlled to bring the speed reduction ratio into "LOW" position, i.e., to increase the speed reduction ratio. As the accelerator pedal is depressed, the output power of the engine is increased, resulting in an increase in the reserve horsepower of the engine. Eventually, the relationship between the engine rotational speed and the vehicle speed shifts from the point A to a point B where the engine rotational speed is N2 and the vehicle speed is V2.

The reserve horsepower of the engine means the engine horsepower as it increases when the accelerator pedal is depressed, and serves as a horsepower to accelerate the motor vehicle. While the motor vehicle is cruising, for example, the engine output power and the horsepower required to move the motor vehicle balance each other, with the reserve horsepower being nil. When the accelerator pedal is then depressed, the engine horsepower is increased, and such an increase in the engine horsepower is called a reserve horsepower. The reserve horsepower is used as the horsepower to accelerate the motor vehicle.

If the speed reduction ratio of the continuously variable transmission is controlled using only the target engine rotational speed Neo as a value to be controlled, then when the accelerator pedal is depressed, the continuously variable transmission is controlled to change the speed reduction ratio toward "LOW" position in order to bring the engine rotational speed into conformity with the target value N2. At this time, since the engine rotational speed is increased due to the reserve horsepower of the engine, the continuously variable transmission is then controlled to change the speed reduction ratio toward "TOP" position in order to accelerate the motor vehicle with the reserve horsepower of the engine. During the above control process, however, the engine rotational speed tends to overshoot, or the speed reduction ratio changes in a manner to make the driver feel strange.

In view of the above drawbacks, the applicant has devised a control method as disclosed in Japanese laid-open patent publications Nos. 63-53343, 63-53344, 63-53345, 63-53346, 1-93662, 1-120475, and U.S. Pat. No. 5,166,877, for example.

According to the disclosed control method, the rate of change di/dt of the speed reduction ratio of a continuously variable transmission (i: speed reduction ratio) is calculated as the sum of a component (referred to as "power term di(P)") corresponding to a predicted acceleration obtained from the reserve horsepower of the engine and a component (referred to as "engine rotation term di(Ne)") corresponding to a target rate of change for the engine rotational speed. The continuously variable transmission is controlled using the rate of change di/dt of the speed reduction ratio as a value to be controlled.

Specifically, when the accelerator pedal is depressed while the motor vehicle is cruising at the point A in FIG. 20, a vector C3 is calculated by adding a vector component C1 of the rate of change of the speed reduction ratio, which corresponds to a predicted acceleration obtained from the reserve horsepower of the engine, and a vector component C2 of the rate of change of the speed reduction ratio, which corresponds to a target rate of change for the engine rotational speed. Then, the continuously variable transmission is controlled to change the speed reduction ratio from i1 to i2 depending on the calculated vector C3.

The above control method has no problem when the motor vehicle is cruising or is slowly accelerated or slowly decelerated. However, when the motor vehicle runs in a transient state, i.e., when the accelerator is abruptly depressed for accelerating the motor vehicle, i.e., for largely varying the speed reduction ratio, the value to be controlled changes toward the target value in a manner that does not satisfy the request from the driver. As a result, the driver does not feel good in such a transient running state. The process of controlling the continuously variable transmission to skip from a normal running condition to an abruptly accelerated or decelerated condition for abruptly accelerating or decelerating the motor vehicle is referred to as a "skip control process".

The applicant has also proposed a method of controlling the speed reduction ratio of a continuously variable transmission as disclosed in Japanese laid-open patent publication No. 2-249727. According to the disclosed control method, a target acceleration to be reached is established depending on the accelerator opening, and a target acceleration is established which is required to change the present acceleration to the target acceleration to be reached with desired characteristics. The continuously variable transmission is then controlled to obtain the target acceleration.

To carry out the above control method, a component (referred to as "acceleration term di(G)") corresponding to the difference between the target acceleration and the present acceleration is established, and the rate of change di/dt of the speed reduction ratio is determined by adding the acceleration term di(G) to the sum of the power term di(P) and the engine rotation term di(Ne).

Specifically, when the driver depresses the accelerator pedal so as to accelerate the motor vehicle, the rate of change di/dt of the speed reduction ratio which is required by the depression of the accelerator pedal is calculated, and the calculated value is applied to an actuator for controlling the speed reduction ratio. The control method is thus capable of controlling the speed reduction ratio in a manner to meet the request from the driver even while the motor vehicle is running in a transient state. However, a certain period of time elapses after the depression of the accelerator pedal is detected until the rate of change di/dt of the speed reduction ratio is calculated and applied to the actuator, and the actuator itself starts to operate with a certain time lag. Because of such time lags, the motor vehicle starts to be accelerated with a time lag in response to the depression of the accelerator pedal, with the result that the response of the motor vehicle to the depression of the accelerator pedal is relatively poor.

SUMMARY OF THE INVENTION

It is therefore an object of the present invention to provide a method of controlling a continuously variable transmission for a motor vehicle to effect a skip control process with a improved response to a request from the driver for acceleration or deceleration, e.g., the movement of a shift lever.

The response of an actuator for controlling the speed reduction ratio of a continuously variable transmission varies from actuator to actuator depending on the structure thereof. The present invention is therefore not concerned with such an actuator, but directed to only a transmission control method to produce a control signal to be applied to an actuator for a better response.

According to the present invention, a power term di(P) is determined from a predicted acceleration $dVo/dt$ calculated from the reserve horsepower of an engine on a motor vehicle, an engine rotational speed Ne, and a vehicle speed V according to the equation: $di(P) = -C1 \times (Ne/V^2) \times dVo/dt$; an engine rotation term di(Ne) is determined from a target rate of change $dNeo/dt$ of the engine rotational speed which is determined from an indication by a driver of the motor vehicle of an intention to accelerate or decelerate the motor vehicle (e.g., the accelerator opening of the engine), and the vehicle speed V according to the equation: $di(Ne) = C2 \times (1/V) \times dNeo/dt$; an acceleration term di(G) is determined from a present acceleration Ga, a target acceleration Gon, the engine rotational speed Ne, and the vehicle speed V according to the equation: $di(G) = C3 \times (Ne/V^2) \times (Gon - Ga)$; and the power term, the engine rotation term, and the acceleration term are added to obtain the rate of change di/dt of the speed reduction ratio according to the equation: $di/dt = -C1 \times (Ne/V^2) \times dVo/dt + C2 \times (1/V) \times dNeo/dt + C3 \times (Ne/V^2) \times (Gon - Ga)$. The determined rate of change di/dt of the speed reduction ratio is used as a control value to control the speed reduction ratio.

Furthermore, if the rate of change of the indication (accelerator opening) is greater than a predetermined value, a target engine rotational speed Neo is greater than an actual engine rotational speed Nea, and the target acceleration Gon is greater than the present acceleration Ga on an acceleration side (positive side), then an acceleration skip control process is determined as being required. During an acceleration skip control process time T0 immediately after the acceleration skip control process is determined as being required, the acceleration skip control process is carried out to increase the rate of change di/dt of the speed reduction ratio.

If the acceleration skip control process is determined as being required, then it is preferable during a first predetermined time T1 ($<$T0) immediately after the acceleration skip control process is determined as being required, to output a predetermined preliminary skip control value corresponding to the vehicle speed as the rate of change di/dt of the speed reduction ratio to increase the rate of change di/dt of the speed reduction ratio.

The rate of change di/dt of the speed reduction ratio is outputted as the control value based on a control cycle for a first interval (t1) to control the rate of change di/dt of the speed reduction ratio. It is preferable to determine whether the acceleration skip control process is required or not based on a control cycle for a second interval (t2) shorter than the first interval (t1), and if the acceleration skip control process is determined as being required, then the control cycle for the first interval is reset and the preliminary skip control valve is outputted as a control value immediately after the acceleration skip control process is determined as being required.

If the acceleration skip control process is determined as being required, then during a second predetermined time T2 (T0=T1+T2) after elapse of the first predetermined time T1, the acceleration term di(G) is preferably multiplied by a skip coefficient K(G) corresponding to the actual vehicle speed to increase the acceleration term di(G).

The skip coefficient K(G) is greater as a rate of change of an accelerator opening of the engine is greater.

The above process is the acceleration skip control process. The present invention is also applicable to a deceleration skip control process. In the deceleration skip control process, the rate of change di/dt of the speed reduction ratio which is determined by adding the power term, the engine rotation term, and the acceleration term is used as a control value to control the speed reduction ratio. If the accelerator opening is substantially fully closed and also the range of the continuously variable transmission is detected as being changed from a normal running range to a low-speed running range, then the deceleration skip control process is determined as being required. The deceleration skip control process is carried out to increase the rate of change di/dt of the speed reduction ratio for a deceleration skip control process time t01 immediately after the deceleration skip control process is determined as being required.

If the acceleration or deceleration skip control process is determined as being required, then the rate of change of the speed reduction ratio is increased for a predetermined time (skip control process time) immediately after the acceleration or deceleration skip control process is determined as being required. During this time, the control value applied to an actuator is increased, and the actuator operates to bring the speed reduction ratio quickly toward an acceleration side (i.e., "LOW" position), resulting in an increase in the response of the transmission.

If the acceleration skip control process is determined as being required, then the control cycle for the first interval may be reset, and a preliminary skip control value may be outputted as a control value immediately after the acceleration skip control process is determined as being required. In this manner, the acceleration skip control process may be started in the midst of the control cycle for a higher response.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 11 is a flowchart of a process for preliminary skip control;

FIG. 17 is a flowchart of a normal process of controlling the speed reduction ratio;

DETAILED DESCRIPTION OF THE PREFERRED EMBODIMENT

Figure 1:
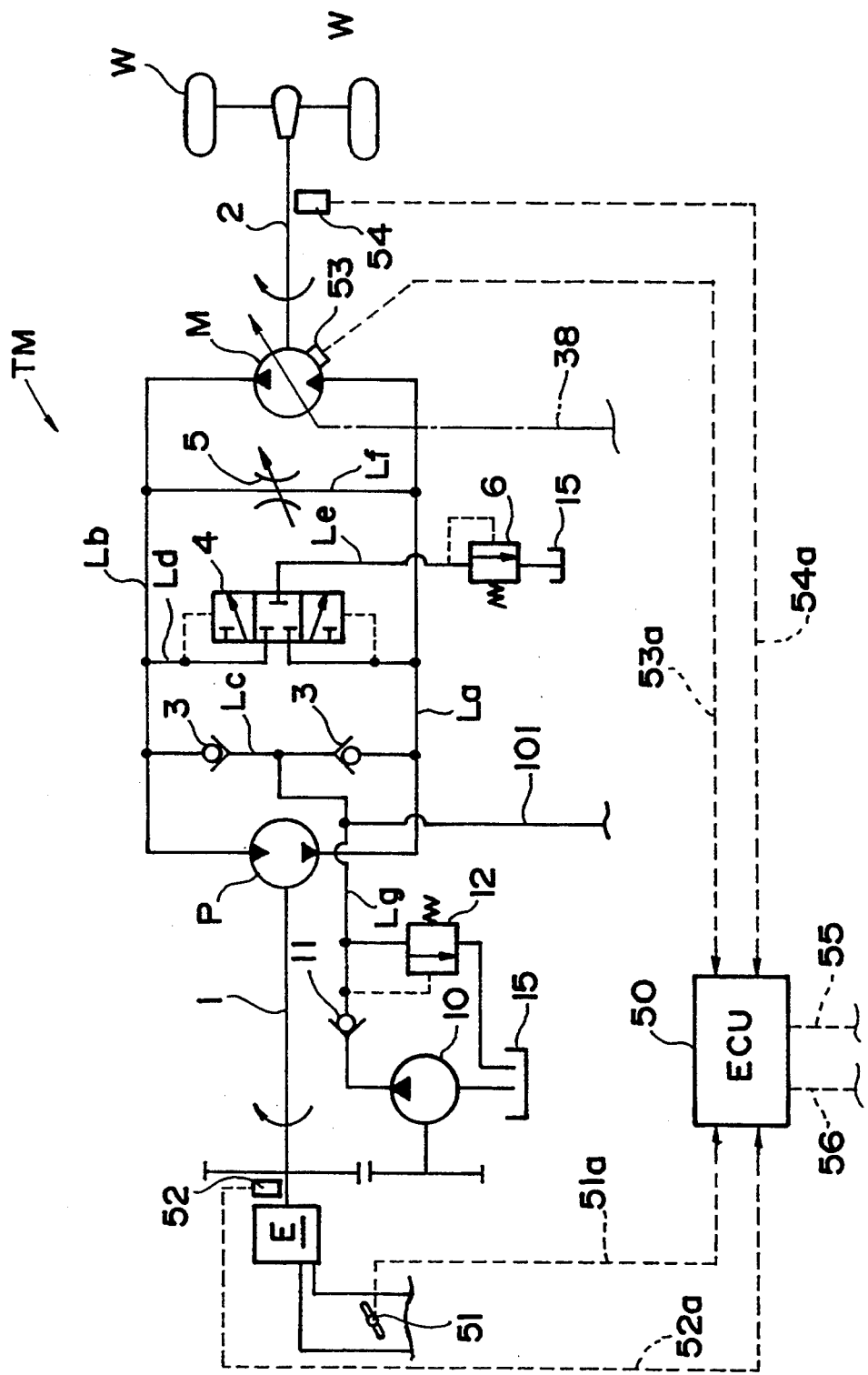
FIG. 1 is a circuit diagram of a hydraulic-electric circuit of a hydraulically operated continuously variable transmission to be controlled by a method according to the present invention.

The principles of the present invention are particularly useful when embodied in a method of controlling a hydraulically operated continuously variable transmission mounted on a motor vehicle as shown in FIG. 1.

The hydraulically operated continuously variable transmission, generally denoted by TM, generally comprises a fixed-displacement hydraulic pump P drivable by an engine E on the motor vehicle through an input shaft 1 and a variable-displacement hydraulic motor M for driving road wheels W of the motor vehicle through an output shaft 2. The pump P and the motor M are hydraulically coupled to each other in a closed hydraulic circuit by a first oil passage La which interconnects an outlet port of the pump P and an inlet port of the motor M and a second oil passage Lb which interconnects an outlet port of the motor M and an inlet port of the pump P.

When the pump P is actuated by the engine E, it discharges oil, and the discharged oil is supplied through the first oil passage La to the motor M, which is then rotated. The oil is then discharged from the motor M and flows through the second oil passage Lb back to the pump P. At this time, the oil pressure in the first oil passage La is higher than the oil passage in the second oil passage Lb. When an engine brake is applied by the road wheels W as upon deceleration of the motor vehicle, the oil also flows from the pump P through the first oil passage La to the motor M and returns from the motor M through the second oil passage Lb to the pump P, but the oil pressure is higher in the second oil passage Lb than in the first oil passage La.

A charging pump 10 drivable by the engine E has an outlet port connected to the closed hydraulic circuit through a charging oil passage Lg having a check valve 11 and a third oil passage Lc having a pair of check valves 3. Oil drawn from an oil tank 15 by the charging pump 10 is regulated in pressure by a charging pressure relief valve 12, and supplied to a lower-pressure one of the first and second oil passages La, Lb by the check valves 3.

An oil passage Ld with a shuttle valve 4 and an oil passage Lf with a clutch valve 5 are connected between the first and second oil passages La, Lb. The shuttle valve 4 connects a lower-pressure one of the first and second oil passages La, Lb to a low-pressure relief valve 6 through an oil passage Le. Oil supplied from the closed hydraulic circuit through the shuttle valve 4 to the low-pressure relief valve 8 returns to the oil tank 15.

The clutch valve 5 serves to control the opening of the oil passage Lf. When the oil passage Lf is opened by the clutch valve 5, a short circuit is established between the first and second oil passages La, Lb. Therefore, the oil discharged by the pump P flows through the oil passage Lf, and is not supplied to the motor M. Consequently, the hydraulically operated continuously variable transmission TM can be clutch-controlled by controlling the clutch valve 5 to vary the opening of the oil passage Lf.

The hydraulic motor M may comprise a swash-plate axial-plunger motor, for example. The displacement of the motor M can be controlled when the angle of the swash plate of the motor M is controlled. The swash plate of the motor M is coupled through a link mechanism 38 to a speed-reduction-ratio control servo unit 30 shown in FIG. 2. When the speed-reduction-ratio control servo unit 30 operates to vary the displacement of the variable-displacement hydraulic motor M, therefore, the speed reduction ratio i (=the ratio of the rotational speed of the input shaft i to the rotational speed of the output shaft 2) of the transmission TM can be controlled, i.e., varied.

Figure 2:
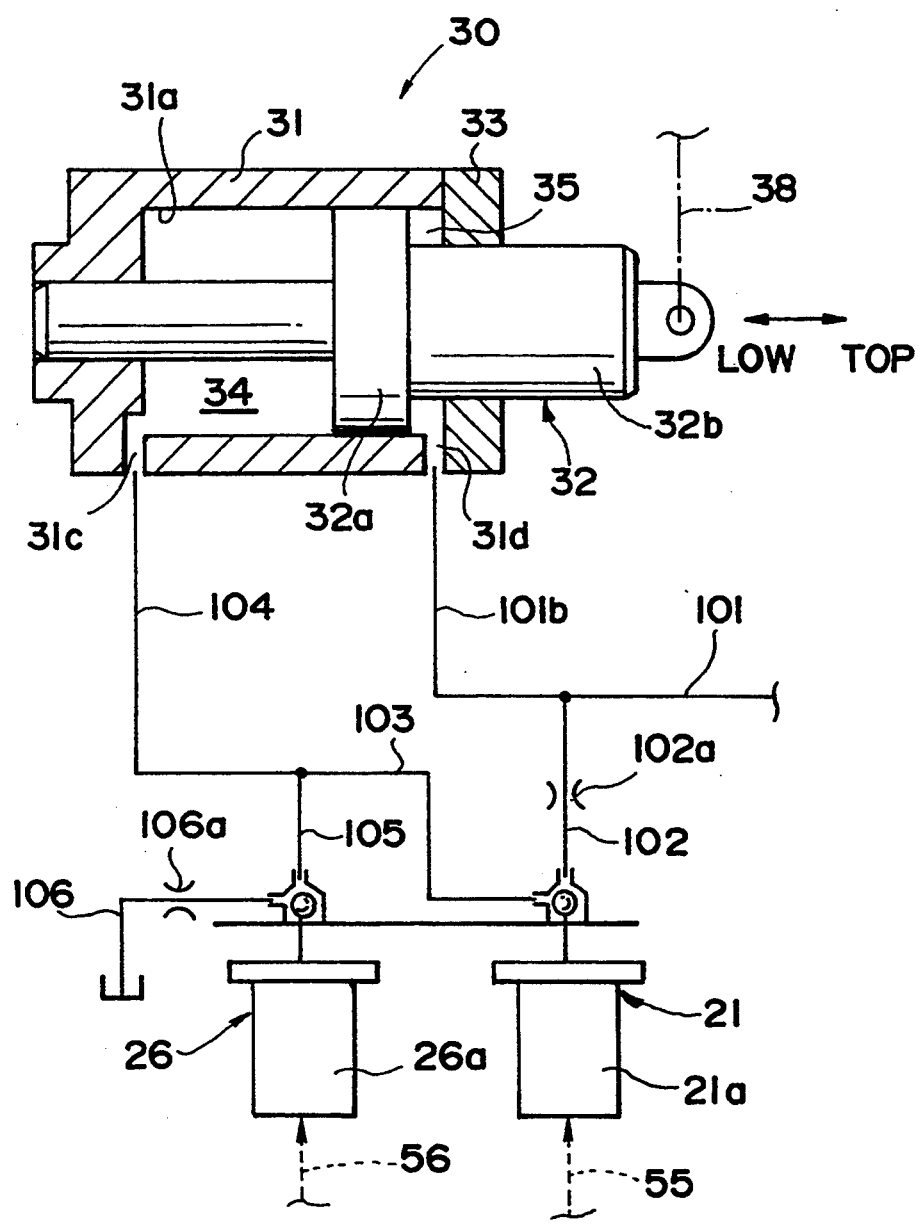
FIG. 2 is a cross-sectional view of an actuator for controlling the speed reduction ratio of the continuously variable transmission, the view also showing a control circuit for the actuator.

The speed-reduction-ratio control servo unit 30 will be described below with reference to FIG. 2. The servo unit 30 comprises a cylinder 31 having a cylinder bore 31a defined therein, and a piston assembly 32 slidably disposed in the cylinder 31. The piston assembly 32 has a piston 32a slidably fitted in the cylinder bore 31a and a piston rod 32b coaxially connected to the piston 32a and extending through a cap 33 fastened to the cylinder 31 over its open end. The space in cylinder 31, i.e., the cylinder bore 31a, is divided into head- and rod-side oil chambers 34, 35 by the piston 32a. The cylinder 31 has ports 31c, 31d defined in its cylinder wall and communicating with the oil chambers 34, 35, respectively. Oil is supplied to and discharged from the oil chambers 34, 35 through the ports 31c, 31d to move the piston assembly 32 to the left and right as shown in FIG. 2.

The piston rod assembly 32 is operatively connected through the link mechanism 38 to a displacement-varying member, e.g., the swash plate, of the motor M. When the piston rod assembly 32 is moved in the cylinder 31, the displacement of the motor M is varied. In the illustrated embodiment, when the piston rod assembly 32 moves to the right, the speed reduction ratio i is reduced, i.e., changes to "TOP" position, and when the piston rod assembly 32 moves to the left, the speed reduction ratio i is increased, i.e., changes to "LOW" position. Although not shown, the link mechanism 38 may have a servo mechanism for boosting and transmitting the movement of the piston rod assembly 32.

When the pressure of oil supplied through the ports 31c, 31d to the oil chambers 34, 35 of the ratio-reduction-ratio control servo unit 30 is controlled, the movement of the piston rod assembly 32 is controlled to control the speed reduction ratio of the transmission TM. The rod-side oil chamber 35, which has a smaller pressure-bearing area, is supplied at all times with a constant line pressure PL from the charging oil passage Lg (see FIG. 1) through pressure lines 101, 101b. The head-side oil chamber 34, which has a larger pressure-bearing area, is supplied with an oil pressure Pc through a pressure line 104.

The oil pressure Pc is controlled by first and second normally-open duty-controlled solenoid-operated valves 21, 26. The first solenoid-operated valve 21, which is operated by a first solenoid 21a, controls the rate of oil supplied from a pressure line 102, which is branched from the pressure line 101 and has a first orifice 102a, to a pressure line 103, in response to a duty cycle signal that is transmitted from a controller 50 over a control signal line 55 to the first solenoid 21a.

The second solenoid-operated valve 26, which is operated by a second solenoid 26a, is connected between a pressure line 105 coupled to the pressure line 103 and a pressure line 106 having a second orifice 106a. The second solenoid-operated valve 26 controls the rate of oil supplied from the pressure line 105 to the pressure line 106 in response to a duty cycle signal that is transmitted from the controller 50 over a control signal line 56 to the second solenoid 26a. The pressure line 106 is connected to the oil tank 15. Therefore, the second solenoid-operated valve 28 controls the rate of oil drained from the pressure line 105 and hence the pressure line 104 to the oil tank 15.

The pressure line 103 is connected to the pressure line 104, which is held in communication with the head-side oil chamber 84 of the servo unit 30 through the port 31c.

A process of controlling the continuously variable transmission TM to vary the speed reduction ratio will be described below.

The continuously variable transmission TM or its speed reduction ratio is controlled when the first and second solenoids 21a, 26a of the first and second solenoid-operated valves 21, 26 are controlled as indicated by the table below.

| Solenoid | | Speed reduction |
|---|---|---|
| 21a | 26a | ratio i |
| ON | ON | HOLD |
| DUTY | ON | TOP |
| ON | DUTY | LOW |

As shown in the above table, when the first and second solenoids 21a, 26a are controlled in operation, the speed reduction ratio i can be held as it is, or changed to "TOP" position (i.e., reduced), or changed to "LOW" position (i.e., increased).

When both the first and second solenoids 21a, 26a are turned on, both the first and second solenoid-operated valves 21, 26 are closed. Since the pressure line 104 connected to the head-side oil chamber 34 of the servo unit 30 is closed, the piston rod assembly 32 is held in position, and hence the speed reduction ratio i is held, i.e., remains unchanged.

When the second solenoid 26a is turned on to close the second solenoid-operated valve 26 and the first solenoid 21a is controlled in duty cycle, the line pressure PL is supplied through the pressure lines 102, 103, 104 to the head-side oil chamber 34 of the servo unit 30. Although the line pressure PL always acts in the rod-side oil chamber 35, since the pressure-bearing area of the rod-side oil chamber 35 is smaller than the pressure-bearing area of the head-side oil chamber 34, the piston rod assembly 32 is moved to the right by the oil pressure in the head-side oil chamber 34. The speed reduction ratio is now changed to "TOP" position. The rate of oil supplied from the pressure line 104 to the head-side oil chamber 34 corresponds to the duty ratio of the first solenoid 21a. Therefore, when the duty ratio of the first solenoid 21a is controlled, the speed at which the piston rod assembly 32 moves to the right, i.e., the rate of change di/dt of the speed reduction ratio toward "TOP" position, can freely be controlled.

Conversely, when the first solenoid 21a is turned on to close the first solenoid-operated valve 21 and the second solenoid 26a is controlled in duty cycle, the oil in the head-side oil chamber 34 of the servo unit 30 can be drained to the oil tank 15 through the pressure lines 104, 105, 106. The piston rod assembly 32 now moves to the left, changing the speed reduction ratio to "LOW" position. The rate of oil discharged from the head-side oil chamber 34 corresponds to the duty ratio of the second solenoid 26a. Therefore, when the duty ratio of the second solenoid 26a is controlled, the speed at which the piston rod assembly 32 moves to the left, i.e., the rate of change di/dt of the speed reduction ratio toward "LOW" position, can freely be controlled.

As described above, the speed reduction ratio can be controlled by controlling the operation of the first and second solenoid-operated valves 21, 26. The operation of these first and second solenoid-operated valves 21, 26 is controlled based on control signals that are supplied from the controller 50 over the control signal lines 55, 56.

The controller 50 is supplied with an accelerator opening signal θap that is transmitted from an engine throttle opening sensor 51 over a signal line 51a, an engine rotational speed signal Nea that is transmitted from an engine rotation sensor 52 over a signal line 52a, a trunnion angle signal θtr that is transmitted from a trunnion angle sensor 53 over a signal line 53a, and a vehicle speed signal V that is transmitted from a vehicle speed sensor 54 over a signal line 54a. The controller 50 calculates a rate of change di/dt of the speed reduction ratio from the supplied signals θap, Nea, θtr, V, and applies control signals to the first and second solenoids 21a, 26a for achieving the calculated rate of change di/dt.

A control process carried out by the controller 50 to control the speed reduction ratio of the continuously variable transmission TM will be described below.

The speed reduction ratio i (=the ratio of the rotational speed of the input shaft 1 to the rotational speed of the output shaft 2) of the transmission TM is expressed by the equation (1):

$$i = Ne/(C' \times V) \tag{1}$$

where Ne is the engine rotational speed, V the vehicle speed, and C' a constant.

The equation (1) is differentiated with respect to time t to determine a rate of change di/dt of the speed reduction ratio as follows:

$$di/dt = \frac{1}{(C' \times V)} \times \left( dNe/dt - \frac{Ne}{(C' \times V)} \times C' \times dV/dt \right). \tag{2}$$

In the equation (2), the rate of change dNe/dt of the engine rotational speed is replaced with a target rate of change dNeo/dt for the engine rotational speed, the acceleration dV/dt with a predicted acceleration dVo/dt, and C=i/C'. Then, the rate of change di/dt of the speed reduction ratio is represented as follows:

$$di/dt = C \times \left(\frac{1}{V}\right) \times dNeo/dt - C \times \left(\frac{Ne}{V^2}\right) \times dVo/dt. \tag{3}$$

As can be understood from the equation (3), the rate of change di/dt of the speed reduction ratio can be given as the sum of a component di(Ne) (=C×1/V×dNeo/dt: hereinafter referred to as "engine rotation term") corresponding to the target rate of change dNeo/dt for the engine rotational speed, and a component di(P) (=−C×Ne/V2×dVo/dt: hereinafter referred to as "power term") corresponding to the predicted acceleration dVo/dt.

The predicted acceleration dVo/dt can be determined as follows:

The output power Pe of the engine E itself is expressed by:

$$Pe = R\mu + Ra + Pa \tag{4}$$

where Rμ is the road resistance, Ra the air resistance, and Pa the reserve horsepower of the engine E. From the equation (4), the reserve horsepower Pa of the engine E is thus given by:

$$Pa = Pe - (R\mu + Ra) \tag{5}$$

The reserve horsepower Pa of the engine E may also be represented by:

$$Pa = (W + \Delta W) \times \frac{1}{g} \times dVo/dt \times \left(\frac{V \times 10}{60^2}\right) \times \frac{1}{75} \tag{6}$$

where W is the total weight of the motor vehicle, ΔW the total weight of the engine upon equivalent inertial rotation, and g the gravitational acceleration (9.8 m/s²).

From the equation (8), the predicted acceleration dVo/dt is given as follows:

$$dVo/dt = Pa \times \frac{g \times 60^2 \times 75}{(W + \Delta W) \times (V \times 10^3)}. \tag{7}$$

Therefore, the predicted acceleration dVo/dt can be calculated from the reserve horsepower Pa of the engine E, and the reserve horsepower Pa of the engine E can be determined using the equation (5).

The target rate of change dNeo/dt for the engine rotational speed can be determined by calculating the speed difference ΔNe between a target engine rotational speed Neo selected depending on the accelerator opening and an actual engine rotational speed Ne, and using a table which has been established depending on the speed difference ΔNe from the viewpoints of drive feeling and fuel consumption.

As a result, the rate of change di/dt of the speed reduction ratio is expressed by the equation (8) below. In the equation (8), the first term is the engine rotation term di(Ne), i.e., the term indicative of a component corresponding to the target rate of change dNeo/dt for the engine rotational speed, and the second term is the power term di(G), i.e., the term indicative of a component corresponding to the predicted acceleration dVo/dt.

$$di/dt = C1 \times \left(\frac{1}{V}\right) \times dNeo/dt - C2 \times \left(\frac{Ne}{V^2}\right) \times dVo/dt \tag{8}$$

where C1, C2 are constants. The terms can be weighted by varying the values of the constants C1, C2.

The speed reduction ratio may be controlled using the rate of change di/dt of the speed reduction ratio as determined according to the equation (8). However, if only the rate of change di/dt of the speed reduction ratio were used, the change of a control valve up to a target speed reduction ratio would not necessarily satisfy the driver's request under such a condition that the accelerator opening varies greatly and the transmission is required to be controlled to vary the speed reduction ratio to a large extent.

In the control process according to the present invention, a present acceleration Ga and a target acceleration Gon required to obtain a desired acceleration change are calculated, and the acceleration term di(G) is calculated, using the calculated present and target accelerations Ga, Gon, according the following equation (9):

$$di(G) = C3 \times (Ne/V^2) \times (Gon - Ga) \quad (9)$$

where C3 is a constant used to weight this term.

The acceleration term di(G) is added to the equation (8) to determine the rate of change di/dt of the speed reduction ratio. That is, the rate of change di/dt of the speed reduction ratio is determined according to the equation (10) below, and the speed reduction ratio is controlled using the determined rate of change di/dt as a control value:

$$di/dt = di(Ne) + di(P) + di(G) \quad (10).$$

When the speed reduction ratio is controlled using the rate of change di/dt, calculated according to the equation (10), as a control value, a desired acceleration change can be obtained from a theoretical viewpoint. Actually, however, the acceleration change tends to appear with a time lag due to a delay in the output of the control value, a delay in the operation of the actuator, and other factors, and the motor vehicle is accelerated with a poor response.

In the control process according to the present invention, such a time lag is minimized to improve the response of the transmission for acceleration. The control process will be described in greater detail below.

Figure 3:
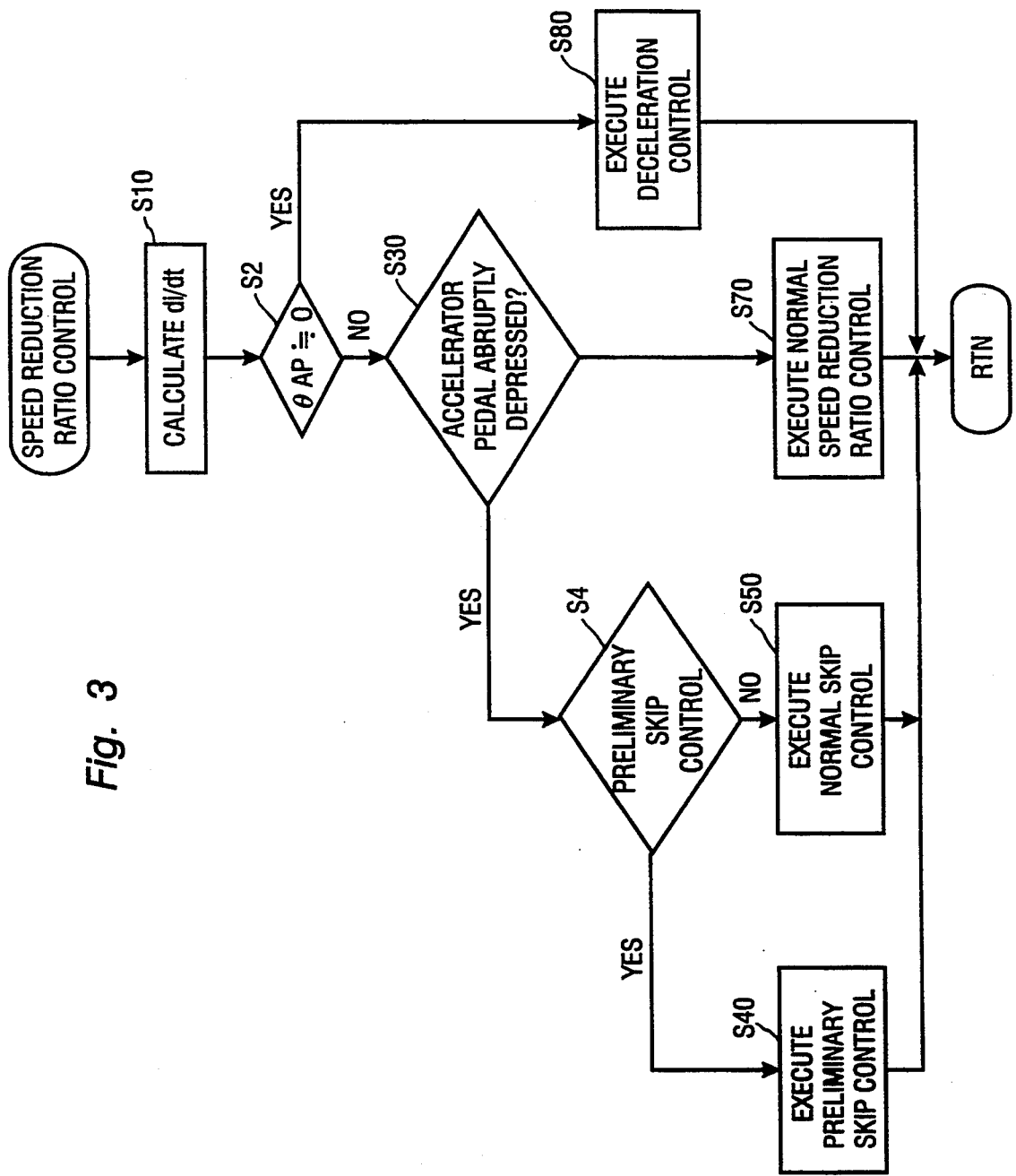
FIG. 3 is a flowchart of a main routine for controlling the speed reduction ratio.

FIG. 3 shows a main routine for controlling the speed reduction ratio.

As shown in FIG. 3, the rate of change di/dt of the speed reduction ratio is calculated in a step S10. The step S10 is shown in greater detail in a subroutine of FIG. 4, and will be described below with reference to FIG. 4.

Figure 4:
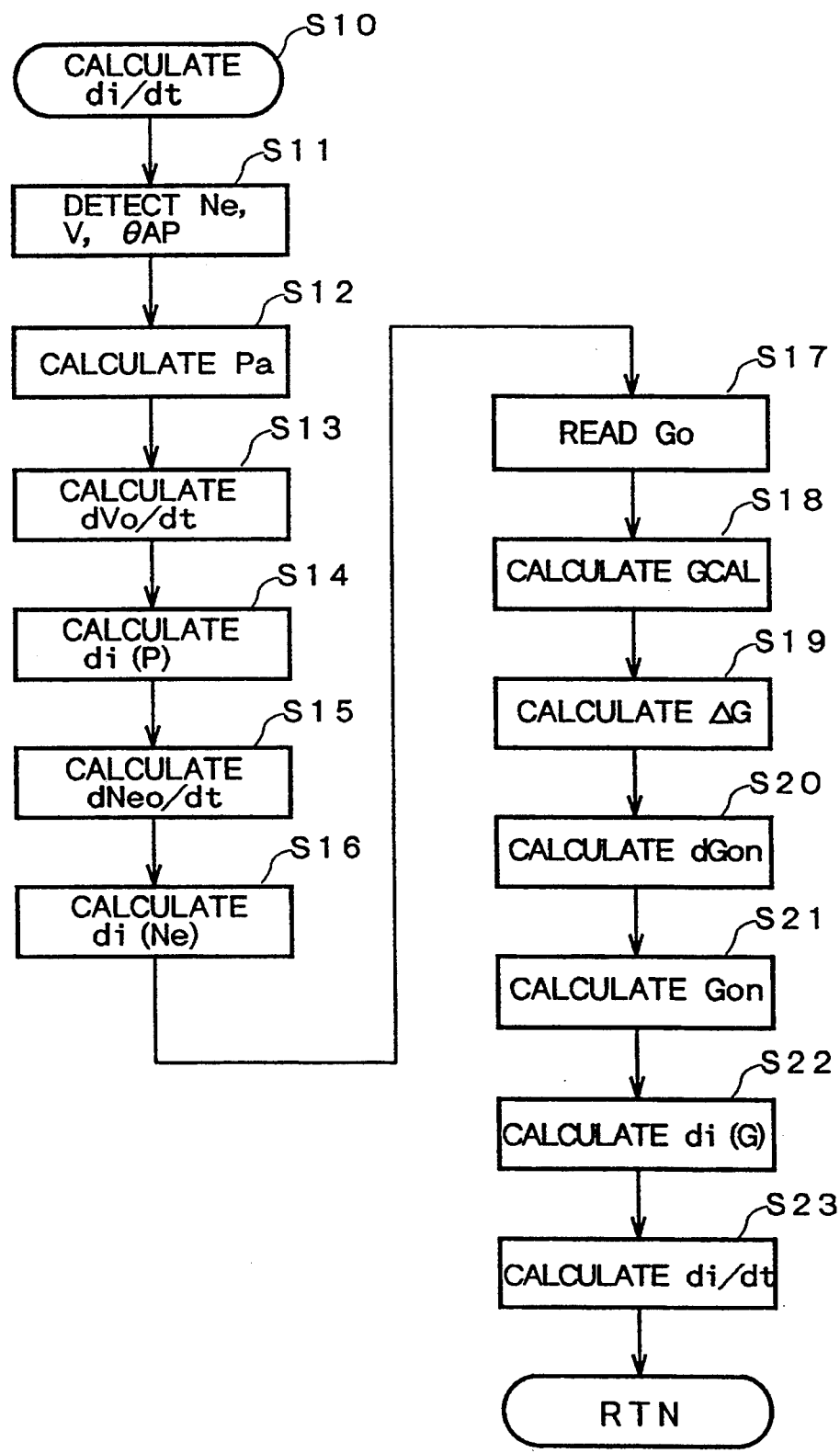
FIG. 4 is a flowchart of a subroutine for calculating the rate of change of the speed reduction ratio.
Figure 5:
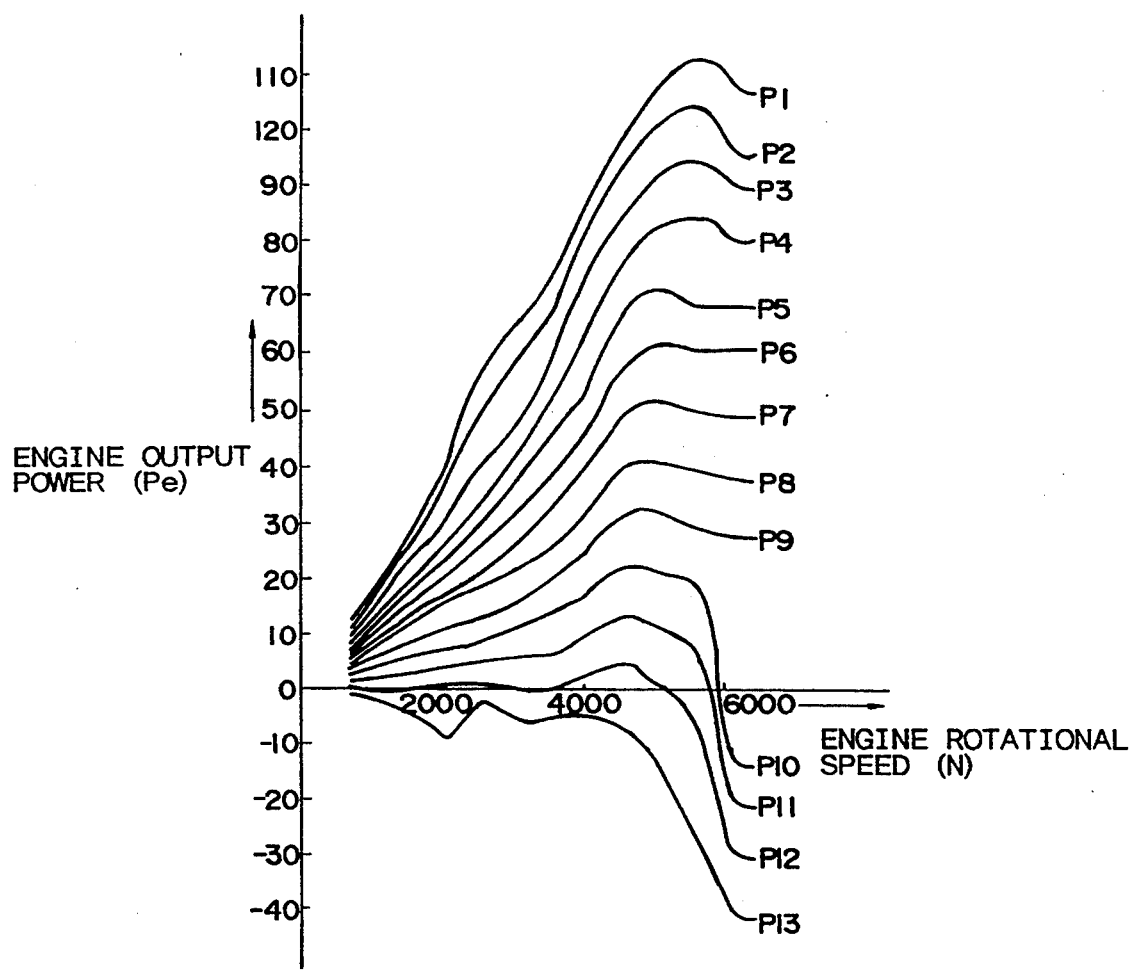
FIG. 5 is a graph showing the relationship between the engine rotational speed and the engine output power.

First, the engine rotational speed Ne, the vehicle speed V, and the accelerator opening θAP are detected in a step S11 in FIG. 4, and then the reserve horsepower Pa of the engine E is calculated in a step S12. The reserve horsepower Pa of the engine E is calculated according to the equation (5) described above. The output power Pe of the engine E itself may be determined from a map shown in FIG. 5, for example. The map shown in FIG. 5 has a horizontal axis representing engine rotational speeds Ne and a vertical axis representing engine output powers Pe, with negative intake pressures P1~P13 as parameters. Therefore, an engine output power Pe can be determined from the engine rotational speed Ne and the negative intake pressure using the map shown in FIG. 5.

The engine output power Pe is determined irrespective of the efficiency of the transmission. An actual engine output power is calculated by correcting the engine output power Pe with the efficiency of the transmission, and the reserve horsepower Pa of the engine E is calculated from the actual engine output power thus calculated.

Using the reserve horsepower Pa thus calculated, the predicted acceleration dVo/dt is calculated according to the equation (7) in a step S13.

Then, the power term di(P) is calculated using the predicted acceleration dVo/dt in a step S14.

Figure 6:
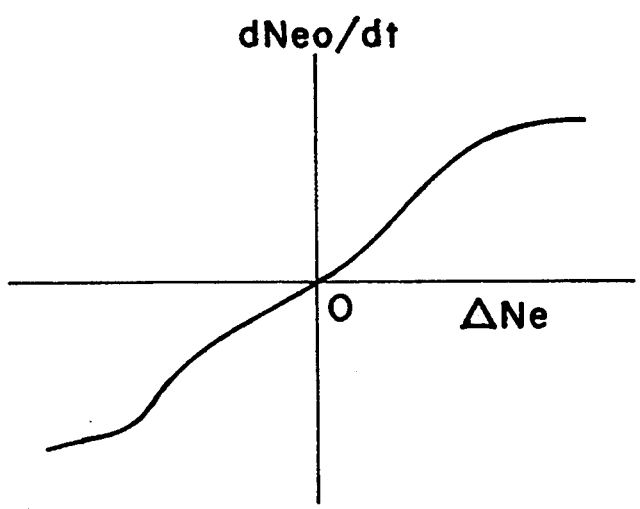
FIG. 6 is a graph showing a table for determining a target rate of change for an engine rotational speed.

Thereafter, the target rate of change dNeo/dt of the engine rotational speed Ne is determined in a step S15. FIG. 6 shows a table of predetermined target rates of change dNeo/dt depending on the difference ΔNe (=Neo−Nea) between a target engine rotational speed Neo (corresponding to the accelerator opening θAP) and an actual engine rotational speed Nea. The target rate of change dNeo/dt of the engine rotational speed Ne is determined from the table of FIG. 6. The engine rotation term di(Ne) is then calculated from the target rate of change dNeo/dt in a step S16.

Thereafter, the acceleration term di(G) is calculated in steps S17 through S22.

Figure 7:
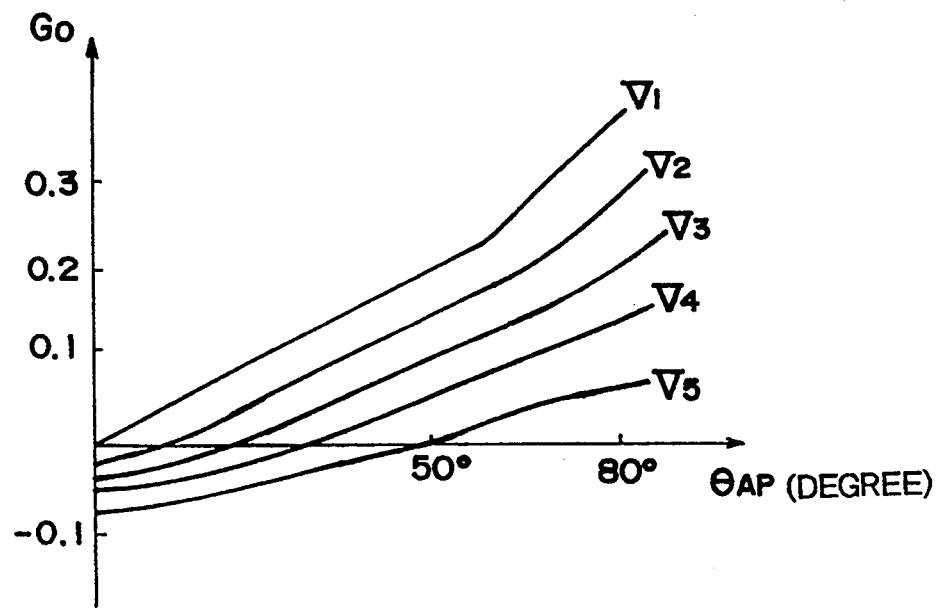
FIG. 7 is a graph showing the relationship between the accelerator opening $\theta AP$ and a target acceleration Go to be reached.

In the step S17, an acceleration required by the accelerator opening, i.e., a target acceleration Go to be reached, is read based on the detected the accelerator opening θAP and the vehicle speed V. FIG. 7 shows desired target accelerations Go to be reached for vehicle speeds V1~V5 with respect to different accelerator openings θAP. A target acceleration Go to be reached for achieving an acceleration responsive to the accelerator pedal depression at a certain vehicle speed can therefore be obtained from the accelerator opening θAP and the vehicle speed V in FIG. 7.

The vehicle speeds V1~V5 shown in FIG. 7 may be selected such that V1=0~20 km/h, V2=40 km/h, ... , V5=150 km/h, for example.

Then, a calculated acceleration GCAL corresponding to the present reserve horsepower Pa of the engine E is calculated in the step S18. More specifically, using the reserve horsepower Pa of the engine E which is calculated according to the equation (5), a predicted acceleration is calculated which is equal to the calculated acceleration GCAL. The calculated acceleration GCAL is an acceleration that actually acts on the motor vehicle at the time, and agrees with the present acceleration Ga. In this control process, rather than actually detecting the present acceleration Ga, the present acceleration Ga is calculated, and the present acceleration Ga is replaced with the calculated acceleration GCAL.

The difference ΔG (=Go−GCAL) between the target acceleration Go to be reached and the calculated acceleration GCAL is calculated in the step S19. Thereafter, based on the acceleration difference ΔG, the step S20 calculates a corrective dGon for the calculated acceleration GCAL required to change the present acceleration (calculated acceleration GCAL) to the target acceleration Go to be reached with desired characteristics.

Figure 8:
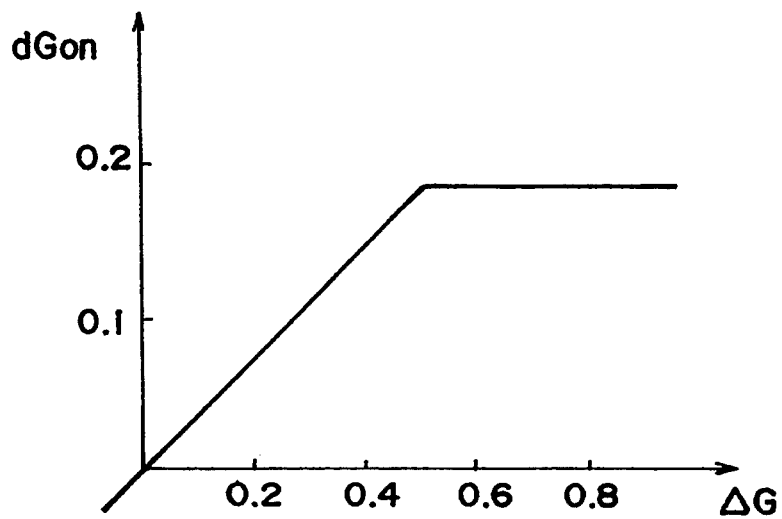
FIG. 8 is a graph showing the relationship between the acceleration difference $\Delta G$ and the acceleration corrective dGon.

The corrective dGon is determined using a map or graph shown in FIG. 8 which contains predetermined correctives which are desired with respect to acceleration differences ΔG. That is, a corrective dGon which corresponds to the present acceleration difference ΔG that has been calculated in the step S19 is determined based on the solid-line curve in FIG. 8.

The corrective dGon is then added to the calculated acceleration GCAL, thereby producing a target acceleration Gon (=GCAL=dGon) in the step S21. The target acceleration Gon is an acceleration required at the present time for changing the present acceleration GCAL to the target acceleration Go to be reached with desired characteristics.

After the target acceleration Gon and the present acceleration GCAL (=Ga) have been calculated, the acceleration term di(G) is calculated using these values in the step S22.

The power term di(P), the engine rotation term di(Ne), and the acceleration term di(G) which have thus been calculated are added to obtain the rate of change di/dt of the speed reduction ratio in a step S23.

After the rate of change di/dt of the speed reduction ratio has been calculated in the step S10, control proceeds to a step S2 which determines whether the accelerator opening θAP is substantially zero or not, i.e., whether the accelerator pedal is not depressed and the engine throttle opening is substantially fully closed or not.

If the accelerator opening θAP is substantially zero in the step S2, then control goes to a step S80 for deceleration control as described later on.

If the accelerator opening θAP is not zero and hence the accelerator pedal is judged as being depressed in the step S2, then control proceeds to a step S30 which determines whether the accelerator pedal is abruptly depressed or not.

Figure 9:
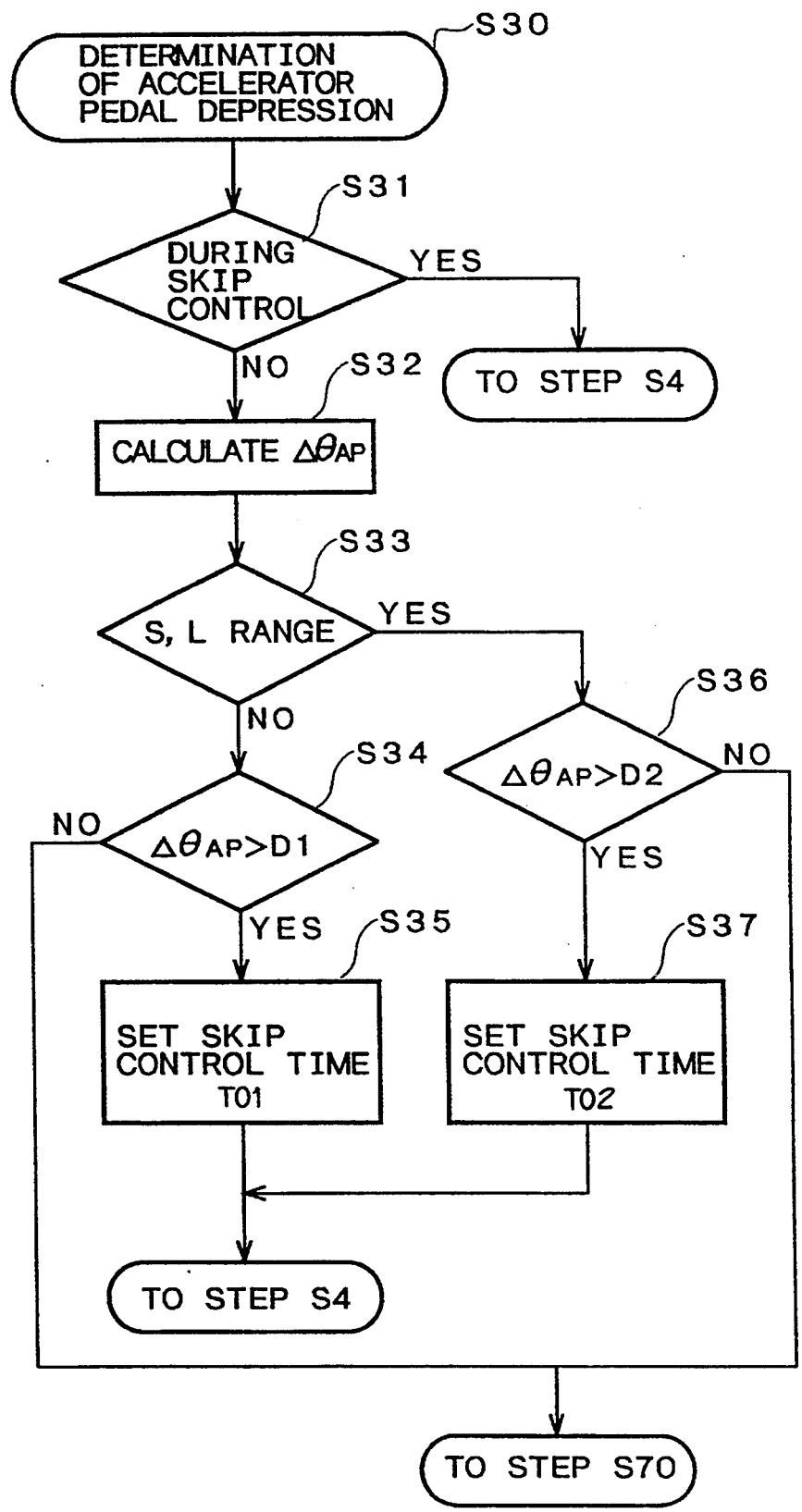
FIG. 9 is a flowchart of a subroutine showing a process for determining whether the accelerator pedal is abruptly depressed or not.

The step S30 is carried out in a subroutine shown in FIG. 9.

As shown in FIG. 9, a step S31 first determines whether a skip control process has been carried out or not. Since the skip control process is carried out after the accelerator pedal is judged as being abruptly depressed, control goes to a step S4 after the skip control process has once started until the skip control process is completed, i.e., until a skip control process time elapses, and the skip control process continues in the step S4.

If no skip control process has started in the step S31, then the rate of change ΔθAP of the accelerator opening is calculated in a step S32, which provides an indication of the rate of change of the vehicle driver's intention to accelerate or decelerate. The rate of change ΔθAP of the accelerator opening is calculated by determining the difference between the accelerator opening that was detected in the previous control cycle and the accelerator opening that has been detected in the present control cycle. The cycles of the control process are carried out at an interval of 10 ms (referred to as first interval t1). In the step S32, the change in the accelerator opening θAP during the time of 10 ms is determined as the rate of change ΔθAP.

Thereafter, a step S33 determines whether a range which is selected by the manual shift lever of the motor vehicle is a D range or either an S range or an L range.

If the selected range is the D range, then control proceeds to a step S34 which determines whether the rate of change ΔθAP of the accelerator opening is greater than a first predetermined value D1 or not. If ΔθAP>D1, then the accelerator pedal is judged as being abruptly depressed, and control goes to a step S35 in which a step control process time T01 is selected. Subsequently, control goes to the step S4.

If the selected range is the S or L range, then control proceeds to a step S36 which determines whether the rate of change ΔθAP of the accelerator opening is greater than a second predetermined value D2 or not. If ΔθAP>D2, then the accelerator pedal is also judged as being abruptly depressed, and control goes to a step S37 in which a step control process time T02 is selected. Subsequently, control goes to the step S4.

The D range is a range selected when the motor vehicle is to run in a normal pattern, and the S or L range is a range selected when the motor vehicle is to run in a sporty, powerful pattern. Because of the different natures of these ranges, the first predetermined value D1 is selected to be greater than the second predetermined value D2. When the accelerator pedal is depressed, it is more likely to be judged as being abruptly depressed in the S or L range than in the D range. That is, when the accelerator pedal is depressed while the motor vehicle is running in the S or L range, the accelerator pedal is judged as being abruptly depressed even if it is depressed more slowly than it is while the motor vehicle is running in the D range, so that the motor vehicle can be accelerated more quickly in the S or L range.

Figure 10:
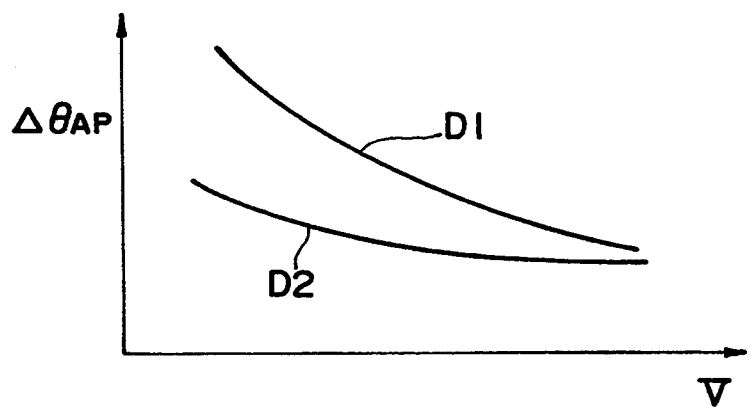
FIG. 10 is a graph showing values used in the process for determining whether the accelerator pedal is abruptly depressed or not.

The first and second predetermined values D1, D2 are selected depending on the vehicle speed V, and are established as shown in FIG. 10.

For the same reason, the skip control process times T01, T02 are selected such that T01<T02.

If ΔθAP≦D1 in the step S34 or ΔθAP≦D2 in the step S36, then since no skip control process is necessary, control goes to a step S70 which carries out a normal process of controlling the speed reduction ratio. The normal process of controlling the speed reduction ratio will be described later on.

If the accelerator pedal is judged as being abruptly depressed in the step S30, then control goes to the step S4 which determines whether a previous skip control process has been effected or not.

If no previous skip control process has been effected, then control goes to a step S40 in which a preliminary skip control process is carried out.

The preliminary skip control process will be described below with reference to FIG. 11.

Figure 12:
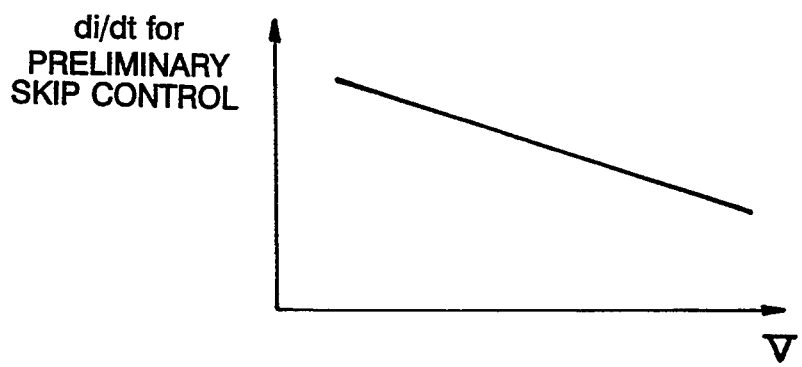
FIG. 12 is a graph showing rates of change of the speed reduction ratio for preliminary skip control.

In the preliminary skip control process, a predetermined rate of change di/dt of the speed reduction ratio for preliminary skip control dependent on the vehicle speed V, as shown in FIG. 12, is read in a step S41. The rates of change di/dt of the speed reduction ratio which are established in FIG. 12 are several times larger than the rate of change di/dt calculated in the step S10 (see FIG. 4). To reset the control cycle, a control flag Fs is set to 4 in a step S42, and control signals for achieving the rate of change di/dt read in the step S41 are applied to the solenoids 21a, 26a in a step S43.

The rate of change di/dt of the speed reduction ratio read in the step S41 is much larger than the rate of change di/dt calculated in the step S10. Consequently, a control value which increases the speed reduction ratio to a large extent is outputted in the preliminary skip control process.

The preliminary skip control process is carried out once in the skip control process time selected in the step S35 or S37. Once the step S40 has been carried out, control goes from the step S4 to a step S50 in a next control cycle, and a normal skip control process is repeated in the step S50 until the skip control process time elapses.

Figure 13:
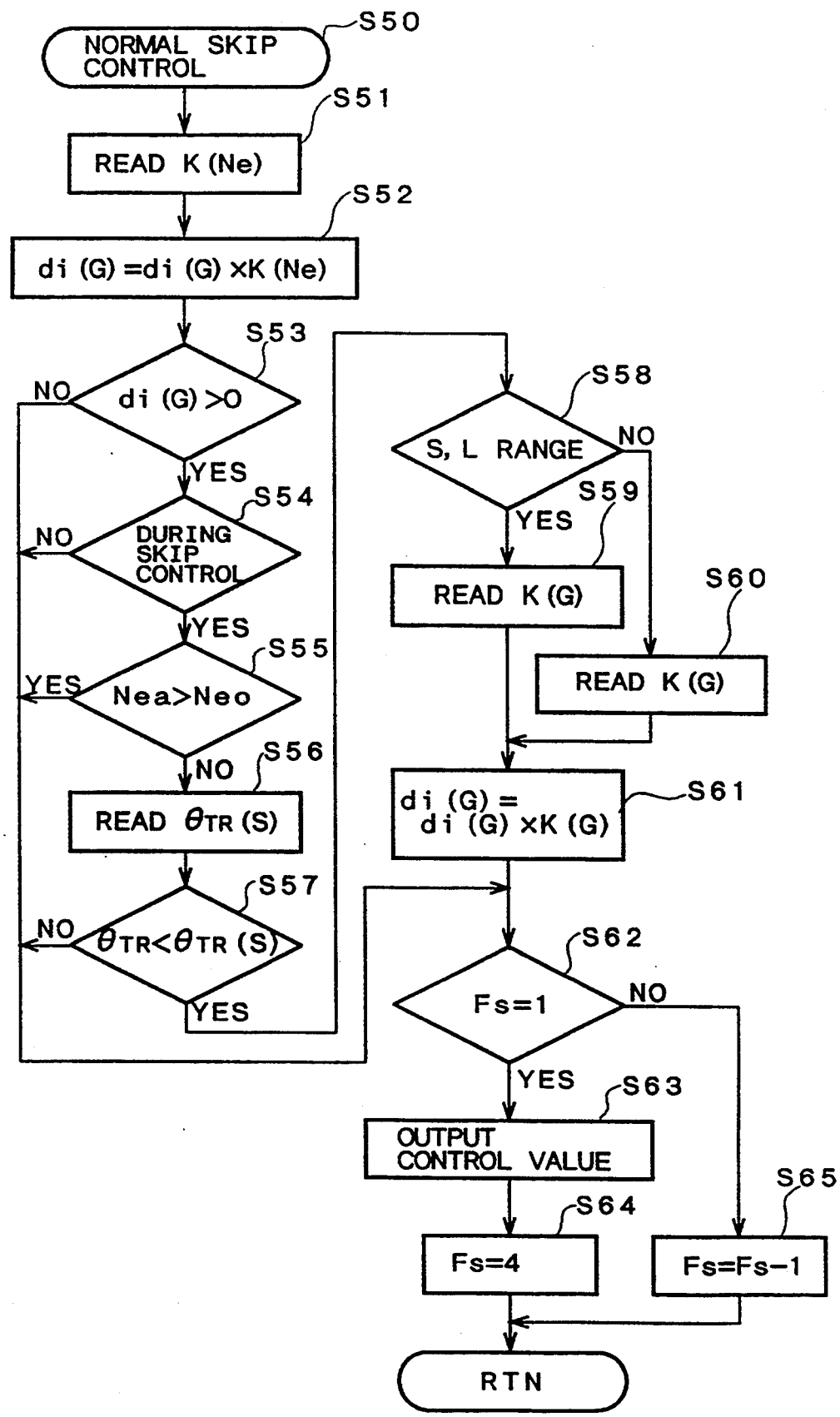
FIG. 13 is a flowchart of a subroutine showing a process for normal skip control.

The normal skip control process will be described below with reference to FIG. 13.

Figure 14:
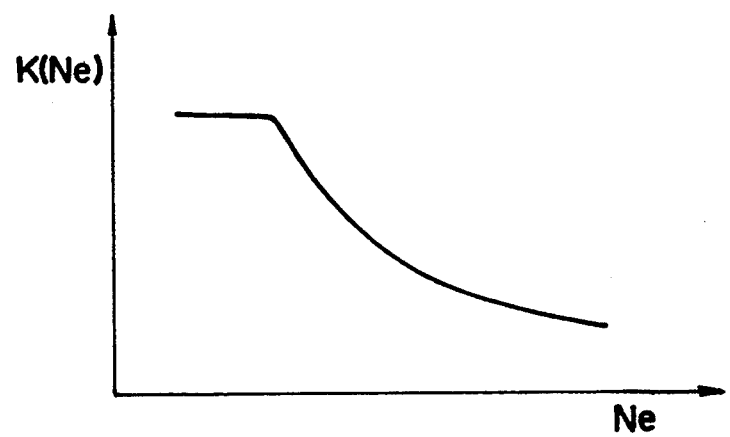
FIG. 14 is a graph showing acceleration term correcting coefficients as a function of engine rotational speeds.

In the normal skip control process, a correcting coefficient K(Ne) corresponding to the engine rotational speed Ne is read from a table shown in FIG. 14 in a step S51, and the acceleration term di(G) is multiplied by the correcting coefficient K(Ne) so that it is corrected in a step S52. As shown in FIG. 14, the correcting coefficient K(Ne) decreases as the engine rotational speed Ne increases. When the engine rotational speed is higher, therefore, the speed reduction ratio is not abruptly increased, thus preventing the engine from rotating at an excessively high speed.

Then, a step S53 determines whether the acceleration term di(G) is of a positive value or not, i.e., whether there is a request for changing the speed reduction ratio for acceleration or not.

If $di(G) > 0$, then control proceeds to a step S54 which determines whether a skip control process is being carried out or not, i.e., whether the skip control process time T01 or T02 established in the step S35 or S37 has elapsed or not. If a skip control process is being carried out, then control proceeds to a step S55 which determines whether the actual engine rotational speed Nea is higher than the target engine rotational speed Neo or not. If $Nea \leq Neo$, then since it is necessary to accelerate the motor vehicle, control goes from the step S55 to a step S56.

Figure 15:
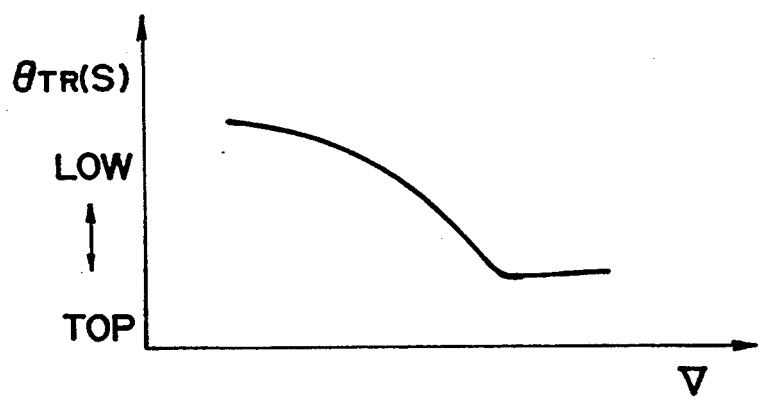
FIG. 15 is a graph showing a table of trunnion angles for allowing skip control.
Figure 16:
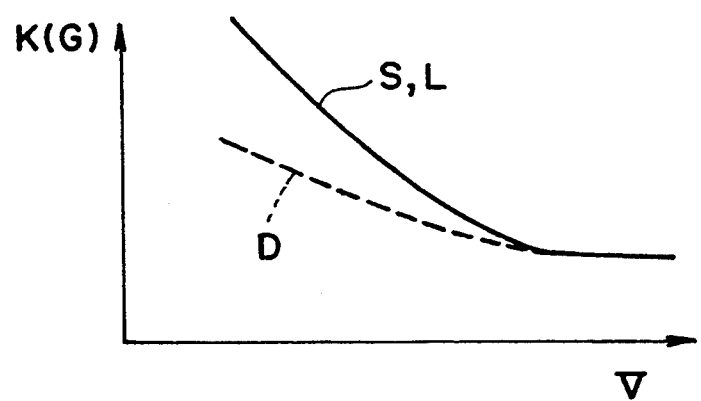
FIG. 16 is a graph showing skip coefficients.

In the step S56, a trunnion angle $\theta TR(S)$ for allowing skip control, which corresponds to the vehicle speed V, is read from a table shown in FIG. 15. Thereafter, a step S57 determines whether $\theta TR < \theta TR(S)$, i.e., whether the speed reduction ratio determined by the trunnion angle $\theta TR$ at this time is more toward "TOP" position than the trunnion angle $\theta TR(S)$ for allowing skip control. If the trunnion angle $\theta TR$ is larger than the trunnion angle $\theta TR(S)$ for allowing skip control, i.e., if the speed reduction ratio is more toward "TOP" position than the speed reduction ratio for allowing skip control, no skip control process is permitted in order to prevent the engine from excessively rotating when the trunnion angle $\theta TR$ is quickly changed toward "LOW" position, which would otherwise be caused by a skip control process.

If $di(G) > 0$, $Nea \leq Neo$, and $\theta TR < \theta TR(S)$, then since an acceleration skip control process is required, control proceeds from a step S58 to a step S59 or S60 which reads a skip coefficient K(G). There are two types of skip coefficients K(G), one for the S and L ranges and one for the D range. The step S58 determines whether the range selected by the manual shift lever is the D range or the S or L range. Then, a skip coefficient K(G) of the determined range is read in the step S59 or S60. The skip coefficients K(G) depend on the vehicle speed V and are of values greater than 1.0.

Then, the acceleration term di(G) is multiplied by the read skip coefficient K(G), so that the acceleration term di(G) is increased, in a step S61. The increased acceleration term replaces the original acceleration term for increasing the rate of change di/dt of the speed reduction ratio. Thereafter, control proceeds from the step S61 to a step S62.

If $di(G) \leq 0$ in the step S53, or if $Nea > Neo$ in the step S55, or if $\theta TR \geq \theta TR(S)$ in the step S57, the steps S58 ~ S60 are skipped, i.e., the rate of change di/dt of the speed reduction ratio is not increased, and control goes to the step S62.

The step S62 determines whether the control flag Fs is Fs=1 or not. Since the control flag Fs has been set to 4 in the preliminary skip control process (step S42), control goes from the step S62 to a step S65 in which the control flag Fs is decremented by 1 and newly set as the control flag Fs.

When the control flag Fs becomes Fs=1, i.e., in the fourth control cycle as counted from the control cycle in which the preliminary skip control process was carried out, control goes from the step S62 to a step S63 in which control values are outputted to the solenoids 21a, 26a to obtain the rate of change di/dt of the speed reduction ratio. If the skip coefficient K(G) is increased in the step S59 or S60, the control values correspond to the increased value.

The control values in the preliminary skip control process are maintained until control values are outputted in the normal skip control process. In the control process according to the present invention, as described above, large control values are outputted in the preliminary skip control process, and then increased control values are outputted in the normal skip control process for thereby changing the speed reduction ratio quickly toward "LOW" position.

The control cycles of the control process are repeated at the first intervals t1 of 10 ms. The control values are outputted once in every four control cycles, i.e., at a second interval t2 of 40 ms. When control values are outputted in the step S63, therefore, the control flag Fs is set to 4. Next control values are outputted in the subsequent fourth control cycle as counted from the present control cycle.

In the above control cycle, the accelerator pedal is judged as being abruptly depressed in the step S30 for the acceleration skip control process. However, if the accelerator pedal is not judged as being abruptly depressed in the step S30, then control goes to the step S70 which carries out a normal process of controlling the speed reduction ratio.

The normal process of controlling the speed reduction ratio is shown in FIG. 17. In this normal process, the speed reduction ratio is controlled based on the rate of change di/dt of the speed reduction ratio calculated in the step S10. In the normal process, the control values are outputted once in every four control cycles, i.e., at a second interval t2 of 40 ms.

The acceleration skip control process and the normal control process have been described above. The control cycle is repeated at the first intervals t1 of 10 ms. Therefore, whether acceleration skip control is necessary or not is determined in the control cycles. However, the control values are outputted once in every four control cycles, i.e., at a second interval t2 of 40 ms.

Even if acceleration skip control is judged as being necessary, a skip control process is not started until the second interval t2 has elapsed, resulting in a delay in the start of the skip control process.

In the control process according to the present invention, if the accelerator pedal is judged as being so abruptly depressed as to require acceleration skip control in the step S30, then the previous skip control process (step S40) is initiated, and even if the second interval t2 has not elapsed, control values for the preliminary skip control process are immediately outputted in the step S43, thereby preventing any control delay from being developed.

At the same time, the control flag Fs is set to 4 to reset the control cycle (step S42). Thus, the previous skip control process continues for the same time as the second interval t2, which is a first predetermined time T1. Thereafter, the normal skip control process starts and continues until the skip control process time, which is an acceleration skip control process time T0, established in the step S37 elapses.

A deceleration control process in the step S80 will be described below.

Figure 18:
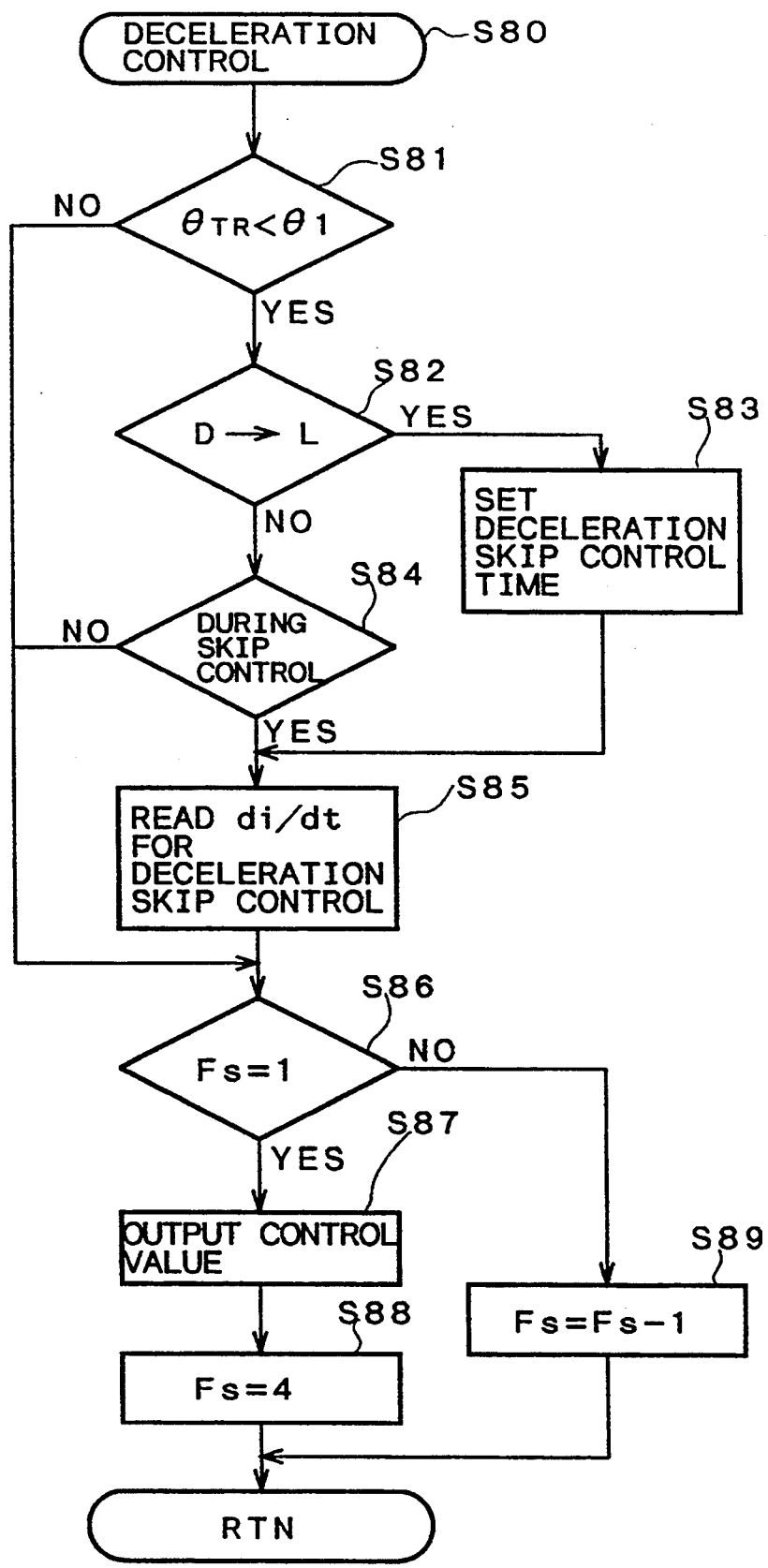
FIG. 18 is a flowchart of a deceleration control process.

The deceleration control process is illustrated in FIG. 18. As shown in FIG. 18, a step S81 determines whether the trunnion angle $\theta TR$ is smaller than a predetermined angle $\theta 1$ or not. In the illustrated transmission TM, the trunnion angle $\theta TR$ is $\theta TR = 0°$ when the speed reduction ratio is in "TOP" position, the trunnion angle $\theta TR$ is $\theta TR = 22°$ when the speed reduction ratio is in "LOW" position, and the predetermined angle $\theta 1$ is $\theta 1 = 19.5°$. If the speed reduction ratio is on the "LOW" position side, making $\theta TR \geq \theta 1$, then no deceleration skip control is carried out to prevent the engine from excessively rotating.

Figure 19:
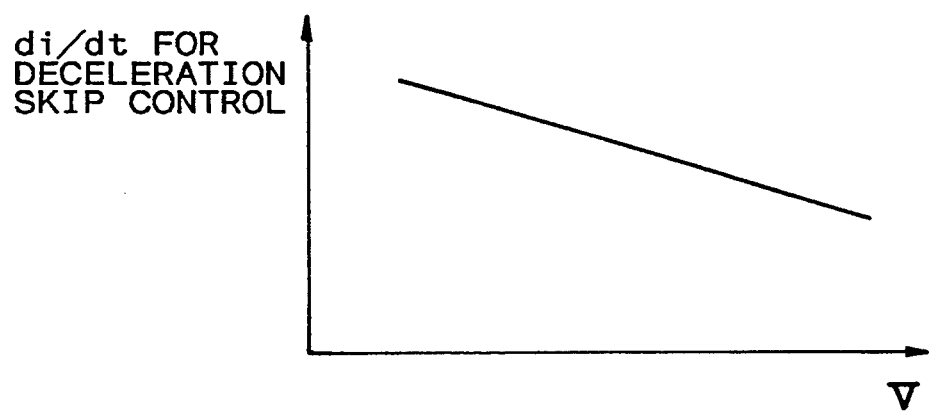
FIG. 19 is a graph showing rates of change of the speed reduction ratio for deceleration skip control.
Figure 20:
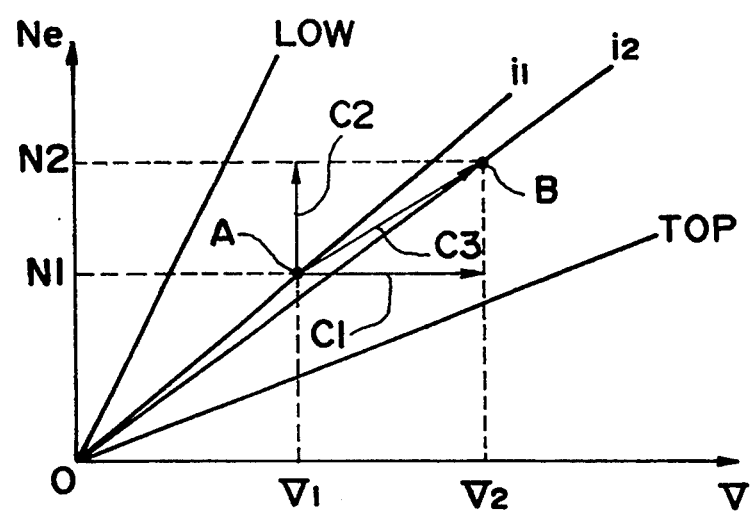
FIG. 20 is a graph showing the relationship between the vehicle speed and the engine rotational speed for use in the control of the continuously variable transmission.

If $\theta TR < \theta 1$ in the step S81, then control proceeds to a step S82 which determines whether the manual shift lever has just been shifted from the D range to the L range or not. The deceleration control process is aimed at the execution of deceleration skip control to prevent a delay in deceleration immediately after the manual shift lever has been shifted from the D range to the L range. Therefore, immediately after the manual shift lever has been shifted from the D range to the L range, control goes to a step S83 in which a deceleration skip control process time is established. Thereafter, control goes to a step S85 which reads a rate of change di/dt for deceleration skip control from a table shown in FIG. 19 based on the vehicle speed V. The rate of change di/dt for deceleration skip control is greater than the rate of change for normal skip control which is calculated in the step S10.

Then, in steps S86 through S89, control values are outputted once in every four control cycles. The control values are the same as the rate of change di/dt for deceleration skip control, which has been read in the step S85. In this manner, when the manual shift lever is shifted from the D range to the L range, the deceleration skip control process is carried out to change the speed reduction ratio quickly toward "LOW" position for preventing a delay in deceleration.

The deceleration skip control process is continued until the deceleration skip control process time is judged as having elapsed in a step S84.

Although a certain preferred embodiment of the present invention has been shown and described in detail, it should be understood that various changes and modifications may be made therein without departing from the scope of the appended claims.

What is claimed is:

1. A method of controlling a continuously variable transmission on a motor vehicle to control a speed reduction ratio using, as a control value, a rate of change di/dt of the speed reduction ratio that is determined using at least one of a reserve horsepower of an engine on the motor vehicle, an engine rotational speed Ne, accelerator opening a vehicle speed V of the motor vehicle, a present acceleration Ga of the motor vehicle, and a target acceleration Gon, said method comprising the steps of:

determining whether a rate of change of an indication by a driver of the motor vehicle of an intention to accelerate or decelerate the motor vehicle is greater than a predetermined value or not;

determining that an acceleration skip control process is required if said rate of change of said indication is greater than said predetermined value; and carrying out the acceleration skip control process to increase the rate of change di/dt of the speed reduction ratio after the acceleration skip control process is determined as being required.

2. A method according to claim 1, wherein said rate of change di/dt of the speed reduction ratio is calculated by adding:

a power term di(P) determined from a predicted acceleration dVo/dt calculated from the reserve horsepower of the engine, said engine rotational speed Ne, and said vehicle speed V;

an engine rotation term di(Ne) determined from a target rate of change dNeo/dt of the engine rotational speed which is determined from said indication, and said vehicle speed V; and an acceleration term di(G) determined from said present acceleration Ga, said target acceleration Gon, said engine rotational speed Ne, and said vehicle speed V.

3. A method according to claim 2, wherein said power term di(P) is determined according to the equation: $di(P) = C1 \times (Ne/V^2) \times dVo/dt$;

said engine rotation term di(Ne) is determined according to the equation: $di(Ne) = C2 \times (1/V) \times dNeo/dt$;

said acceleration term di(G) is determined according to the equation: $di(G) = C3 \times (Ne/V^2) \times (Gon - Ga)$; and said rate of change di/dt of the speed reduction ratio is determined according to the equation $di/dt = -C1 \times (Ne/V^2) \times dVo/dt + C2 \times (1/V) \times dNeo/dt + C34 \times (Ne/V^2) \times (Gon - Ga)$.

4. A method according to any one of claims 1 through 3, wherein said indication by the driver of the motor vehicle of the intention to accelerate or decelerate the motor vehicle is an accelerator opening of the engine.

5. A method according to any one of claims 1 through 3, wherein said acceleration skip control process comprises a preliminary skip control process in which a predetermined preliminary skip control value corresponding to the vehicle speed is used for said rate of change di/dt to increase said rate of change di/dt, and a normal skip control process in which said rate of change di/dt is corrected to be increased corresponding to the vehicle speed.

6. A method according to claim 5, wherein said preliminary skip control process is carried out for a preliminary skip control time (T1) and said normal skip control process is carried out for a normal skip control time (T2), the total time for each said acceleration skip control process being T0(=T1+T2).

7. A method according to claim 6, wherein means to detect whether a normal running range or a low-speed running range is selected is included, a skip control time T01 is used as said total time T0 for said acceleration skip control process when it is detected that said normal running range is selected, and a skip control time T02 is used as said total time T0 for said acceleration skip control process when it is detected that said low-speed running range is selected.

8. A method according to claim 7, wherein said normal running range includes a D-range, and said low-speed running range includes a S-range and a L-range.

9. A method according to claim 5, wherein said preliminary skip control process is carried out immediately after the acceleration skip control process is determined as being required and said normal skip control process is carried out after said preliminary skip control process has been carried out.

10. A method according to claim 9, wherein said preliminary skip control process is carried out for a preliminary skip control time (T1) and said normal skip control process is carried out for a normal skip control time (T2), the total time for each said acceleration skip control process being T0(=T1+T2).

11. A method according to claim 10, wherein means to detect whether a normal running range or a low-speed running range is selected is included, a skip control time T01 is used as said total time T0 for said acceleration skip control process when it is detected that said normal running range is selected, and a skip control time T02 is used as said total time T0 for said acceleration skip control process when it is detected that said low-speed running range is selected.

12. A method according to claim 11, wherein said normal running range includes a D-range, and said low-speed running range includes a S-range and a L-range.

13. A method according to claim 5, wherein said rage of change di/dt of the speed reduction ratio is outputted as a control value based on a control cycle for a first interval (T1) to control the speed reduction ratio, while whether said acceleration skip control process is required or not is determined based on a control cycle for a second interval (t2) shorter than said first interval (t1), and if said acceleration skip control process is determined as being required, the control cycle for the first interval is reset and said preliminary skip control value is outputted as a control value immediately after said acceleration skip control process is determined as being required.

14. A method according to claim 2 or 3, wherein said acceleration term di(G) is corrected by multiplying a skip coefficient K(G) to increase the rate of change di/dt in said normal skip control process.

15. A method according to claim 4, wherein said skip coefficient K(G) is greater as a rate of change of an accelerator opening of the engine is greater.

16. A method according to claim 2 or 3, wherein said acceleration skip control process comprises a preliminary skip control process in which a predetermined preliminary skip control value corresponding to the vehicle speed is used for said rate of change di/dt to increase said rate of change di/dt, and a normal skip control process in which said rate of change di/dt is corrected to be increased corresponding to the vehicle speed, said normal skip control process further comprises the steps of detecting whether a target engine rotational speed Neo corresponding to said indication is greater than an actual engine rotational speed Nea or not, and detecting whether said acceleration term di(G) is positive or not, and said normal skip control is carried out only when said target engine rotational speed Neo is greater than said actual engine rotational speed Nea, and said acceleration term di(G) is positive.

17. A method of controlling a continuously variable transmission on a motor vehicle to control a speed reduction ratio using, as a control value, a rate of change di/dt of the speed reduction ratio that is determined using at least one of a reserve horsepower of an engine on the motor vehicle, an engine rotational speed Ne, a vehicle speed V of the motor vehicle, a present acceleration Ga of the motor vehicle, and a target acceleration Gon, said method comprising the steps of:

detecting whether an accelerator opening of the engine is substantially fully closed or not;

detecting whether a range of the continuously variable transmission is changed from a normal running range to a low-speed running range by a manual shift lever or not;

determining that a deceleration skip control process is required if said accelerator opening is substantially fully closed and also the range of the continuously variable transmission is detected as being changed from the normal running range to the low-speed running range; and setting a rate of change value for deceleration skip control, carrying out the deceleration skip control process by using said rate of change value for deceleration skip control to increase the rate of change di/dt of the speed reduction ratio immediately after the deceleration skip control process is determined as being required.

18. A method according to claim 17, further comprising the steps of:

determining a power term di(P) from a predicted acceleration dVo/dt calculated from the reserve horsepower of the engine, said engine rotational speed Ne, and said vehicle speed V according to the equation: $di(P) = -C1 \times (Ne/V^2) \times dVo/dt$;

determining an engine rotation term di(Ne) from a target rate of change dNeo/dt of the engine rotational speed which is determined from said accelerator opening, and said vehicle speed V according to the equation: $di(Ne) = C2 \times (1/V) \times dNeo/dt$;

determining an acceleration term di(G) from said present acceleration Ga, said target acceleration Gon, said engine rotational speed Ne, and said vehicle speed V according to the equation: $di(G) = C3 \times (Ne/V^2) \times (Gon - Ga)$; and adding said power term, said engine rotation term, and said acceleration term to obtain the rate of change di/dt of the speed reduction ratio according to the equation: $di/dt = -C1 \times (Ne/V^2) \times dVo/dt + C2 \times (1/V) \times dNeo/dt + C3 \times (Ne/V^2) \times (Gon - Ga)$.

* * * * *